(12) United States Patent
Holmes et al.

(10) Patent No.: US 9,840,140 B1
(45) Date of Patent: Dec. 12, 2017

(54) COMPOUND-POWER-SPLIT ELECTRICALLY VARIABLE TRANSMISSIONS WITH MOTOR CLUTCHING DEVICES

(71) Applicant: GM GLOBAL TECHNOLOGY OPERATIONS LLC, Detroit, MI (US)

(72) Inventors: Alan G. Holmes, Clarkston, MI (US); Joseph R. Littlefield, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/229,864

(22) Filed: Aug. 5, 2016

(51) Int. Cl.
- *B60K 6/543* (2007.10)
- *B60K 6/365* (2007.10)
- *F16H 3/72* (2006.01)

(52) U.S. Cl.
CPC .............. *B60K 6/365* (2013.01); *B60K 6/543* (2013.01); *F16H 3/728* (2013.01); *F16H 2200/201* (2013.01); *F16H 2200/2041* (2013.01); *F16H 2200/2043* (2013.01)

(58) Field of Classification Search
None
See application file for complete search history.

(56) References Cited

U.S. PATENT DOCUMENTS

| | | | |
|---|---|---|---|
| 6,439,330 B1 | 8/2002 | Paye | |
| 6,478,705 B1 | 11/2002 | Holmes et al. | |
| 6,527,658 B2 | 3/2003 | Holmes et al. | |
| 6,540,631 B2 | 4/2003 | Holmes | |
| 6,551,208 B1 * | 4/2003 | Holmes | B60K 6/365 180/65.7 |
| 7,022,038 B2 | 4/2006 | Schmidt et al. | |
| 7,220,200 B2 | 5/2007 | Sowul et al. | |
| 7,303,040 B2 | 12/2007 | Green et al. | |
| 7,427,252 B2 | 9/2008 | Holmes | |
| 7,544,141 B2 | 6/2009 | Holmes | |
| 8,196,507 B2 | 6/2012 | Schafer et al. | |
| 8,317,648 B2 | 11/2012 | Robinette et al. | |

(Continued)

OTHER PUBLICATIONS

Benford, Howard and Leising, Maurice, The Lever Analogy: A New Tool in Transmission Analysis, SAE Paper 810102, 1981.

*Primary Examiner* — Justin Holmes
(74) *Attorney, Agent, or Firm* — Quinn IP Law

(57) ABSTRACT

Disclosed are electrically variable transmissions (EVT), methods for making and for using EVTs, and hybrid electric vehicles with EVTs. Presented is a multi-speed power transmission for a motor vehicle with an engine, two electric motors, and a final drive. The transmission includes an input member connectable to the engine, an output member connectable to the final drive, and a stationary member connectable to a gear train. First and second torque-transmitting devices (TTD) respectively connect to the first and second motors. The transmission also includes a compound planetary gear arrangement with four junction points defined by two interconnected planetary gear sets. The first TTD selectively connects the first motor to the first junction point, while the second TTD selectively connects the second motor to the fourth junction point via the gear train. The input member connects at the second junction point, whereas the output member connects at the third junction point.

20 Claims, 2 Drawing Sheets

(56) References Cited

U.S. PATENT DOCUMENTS

| | | |
|---|---|---|
| 8,653,677 B2 | 2/2014 | West |
| 8,656,716 B2 | 2/2014 | Schafer |
| 8,702,544 B2 | 4/2014 | Tamai et al. |
| 8,840,500 B2 | 9/2014 | Tamai et al. |
| 2006/0142104 A1* | 6/2006 | Saller .................... B60K 6/365 475/5 |
| 2008/0103002 A1* | 5/2008 | Holmes ................... B60K 6/40 475/5 |
| 2014/0038776 A1* | 2/2014 | Heap ..................... B60K 6/445 477/180 |
| 2014/0046517 A1* | 2/2014 | Heap ..................... B60W 10/06 701/22 |

* cited by examiner

COMPOUND-POWER-SPLIT ELECTRICALLY VARIABLE TRANSMISSIONS WITH MOTOR CLUTCHING DEVICES

TECHNICAL FIELD

The present disclosure relates generally to hybrid powertrains for motorized vehicles. More specifically, aspects of this disclosure relate to electrically variable transmissions (EVT) having both electrical and mechanical drive paths to provide split-mode operation within the transmission.

BACKGROUND

Conventional motor vehicles, such as the modern-day automobile, are built with a powertrain that operates to propel the vehicle and power the onboard vehicle electronics. The powertrain, which is inclusive of and sometimes improperly referred to as a drivetrain, is generally comprised of an engine that delivers driving power to the vehicle's final drive system (e.g., front and/or rear differential, front and/or rear axle, and wheels) through a multi-speed power transmission. Automobiles have traditionally been powered by a reciprocating-piston type internal combustion engine (ICE) because of its ready availability and relatively inexpensive cost, light weight, and overall efficiency. Such engines include 2-stroke or 4-stroke compression-ignited diesel engines and 4-stroke spark-ignited gasoline engines, along with six-stroke and rotary engines.

Hybrid vehicles, on the other hand, utilize alternative power sources to propel the vehicle in order to minimize reliance on the engine for power and thereby increase overall vehicle fuel economy. A hybrid electric vehicle (HEV), for example, incorporates both electric energy and chemical energy, and converts the same into mechanical power to propel the vehicle and power the vehicle systems. The HEV generally employs one or more electric machines (E-machine), such as electric motor/generators, that operate individually or in concert with an internal combustion engine to propel the vehicle. Since hybrid vehicles can derive their power from sources other than the engine, engines in hybrid vehicles can be turned off while the vehicle is propelled by the alternative power source(s).

Series hybrid architectures are generally characterized by an internal combustion engine drivingly coupled to an electric generator. The electric generator, in turn, provides power to one or more electric motors that operate to rotate the final drive members. In effect, there is no driving mechanical connection between the engine and the final drive members in a series hybrid powertrain. The lack of a mechanical link between the engine and wheels allows the engine to be run at a constant and efficient rate, e.g., closer to the theoretical limit of 37%, rather than the normal average of 20%, even as vehicle speed changes. The electric motor/generator may also operate in a motoring mode to provide a starting function to the internal combustion engine. This system may also allow the electric motor(s) to recover energy from slowing the vehicle and storing it in the battery through "regenerative braking."

Power-split hybrid architectures, by comparison, can be typified by an internal combustion engine and one or more electric motor/generator assemblies, each of which has a driving mechanical coupling to the power transmission. Most power-split hybrid designs combine a large electric generator and a motor into one unit, providing tractive power and replacing both the conventional starter motor and the alternator. One such power-split hybrid powertrain architecture comprises a two-mode, compound-split, electromechanical transmission which utilizes an input member for receiving power from the ICE, and an output member for delivering power from the transmission to the driveshaft. First and second motor/generators operate individually or in concert to rotate the transmission's output shaft. These motor/generators are electrically connected to an energy storage device, such as a battery pack, for interchanging electrical power between the storage device and motor/generators. A powertrain system control unit is employed to regulate the electrical power exchange between the energy storage device and motor/generators, as well as the power interchange between the motor/generators.

Electrically variable transmissions (EVT) provide for continuously variable speed ratios by combining features from both series and parallel hybrid powertrain architectures. EVTs are operable with a direct mechanical path between the internal combustion engine and final drive, thus enabling relatively high transmission efficiency and the application of lower cost, less massive motor hardware. EVTs are also operable with engine operation that is mechanically independent from the final drive, in various mechanical/electrical split contributions, thereby enabling high-torque continuously-variable speed ratios, electrically dominated launches, regenerative braking, engine-off idling, and two-mode operation.

An EVT can use differential gearing to achieve continuously variable torque and speed ratios between input and output without sending all power through the variable elements. The EVT can utilize the differential gearing to send a fraction of its transmitted power through the electric motor/generator(s). The remainder of its power is sent through another, parallel path that is mechanical and direct (i.e., "fixed ratio"), or alternatively selectable. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used hereinafter to refer to both clutches and brakes), are selectively engageable to activate the aforementioned gear elements for establishing desired forward and reverse speed ratios between the transmission's input and output shafts. The speed ratio is generally defined as the transmission input speed divided by the transmission output speed.

Shifting from one speed ratio to another is generally performed in response to engine throttle and vehicle speed, and normally involves releasing one or more "off-going" clutches associated with the current or attained speed ratio, and applying one or more "on-coming" clutches associated with the desired or commanded speed ratio. Shifts performed in the above manner are termed "clutch-to-clutch" shifts, and require precise timing in order to achieve optimal quality shifting. A shift made from a high speed ratio to a lower speed ratio is referred to commonly as an "upshift," whereas a shift made from a low speed ratio to a higher speed ratio is referred to commonly as a "downshift." Shift control includes "power on" shifting and "power off" shifting. Power on shifting refers to a shift operation that takes place during driver "tip-in," i.e., when the driver depresses the accelerator pedal, while power off shifting refers to a shift operation that takes place during driver "tip-out," i.e., when the accelerator pedal is partially or fully released.

SUMMARY

Disclosed herein are electrically variable transmissions for motor vehicle powertrains, methods for making and methods for using such electrically variable transmissions, and motor vehicles with compound-power-split electrically variable transmissions. By way of non-limiting example, an improved compound-power-split EVT architecture is disclosed with multiple dedicated clutches each acting on one of two motor/generators for either disconnecting the motor/generator or for shifting the motor/generator speed reduction gearing for high-speed operation. This new form of multi-mode hybrid transmission can be implemented with a third "redundant" motor/generator, e.g., that drives a rear axle of the final drive, along with one or more clutches to disconnect the redundant motor, which can help to eliminate redundant motor drag. Such disconnect clutching can be employed instead of a full set of mode-selection hardware. For at least some implementations, it is possible to use two or more sets of transfer gears, instead of using a planetary gear set, to transfer torque from a motor/generator to the rest of the drive system.

Also disclosed are plug-in hybrid electric vehicles (PHV/PHEV) and other hybrid electric vehicle (HEV) configurations equipped with a compound-power-split powertrain. The powertrain contains two or more electric motor/generators, a compound planetary gear set, and at least one set of gears for reducing speed and multiplying torque from a motor/generator to the planetary gear set. At least one clutching device connects the motor/generator with the planetary gear set at a first gear ratio between the motor/generator and a first member of the planetary gear set. The motor/generator is disconnectable so as to remain still or to seek a minimum-loss speed while the vehicle is in forward motion, particularly at high vehicle speeds. Additionally, the motor/generator may be connectible by a second clutching device at a second gear ratio between the motor/generator and a member of the planetary gear set.

In accordance with at least one preferred embodiment, the compound-power-split powertrain includes two drive units, one on the front axle and one on the rear axle of a vehicle. The first drive unit is configured for compound-power-split operation with a clutch between the first of two motor/generators and a compound planetary gear set, and the second drive unit containing a third electric motor/generator. When the first motor/generator is disconnected, the first and second drive units can together form an input-power-split arrangement using a common connection to the road and the second and third motor/generators. The first electric motor/generator can be shifted from one ratio to another, with this shift performed when the torque demanded from the first electric motor/generator is low or zero to minimize disturbance to output. For instance, the electrical power generated by the second motor/generator may be temporarily diverted from the first motor/generator to a battery pack or to the third motor/generator, when a third motor is present.

Attendant benefits for at least some of the disclosed concepts include resolving the relatively low output torque and inflexibility of one-mode compound-split power-flow configurations. Other benefits include increasing the speed and torque combination ("corner power") that is available from an otherwise one-mode compound-split drive unit because of the fixed ratios within the drive unit. If applied to HEV systems with an independent motor (e.g., in a P4 hybrid electric architecture), the system can shift to multi-mode operation via the disconnect clutches, reducing or otherwise eliminating drag of any redundant motor/generators. The system can deliver all-wheel drive (AWD) functionality, increase motor efficiency for cruising at high speeds, and reduce mechanical drag at high speeds.

Aspects of the present disclosure are directed to multi-speed power transmissions having variable-ratio power-split differential gearing and independently shifted power paths through the transmission. Disclosed, for example, is a multi-speed power transmission for a motor vehicle with an engine, two electric motors, and a final drive for propelling the vehicle. The transmission includes an input member for connecting to the engine, and an output member for connecting to the final drive. Also included is a gear train, which may be in the nature of a planetary gear set or a transfer gear set, and a stationary member configured to connect, e.g., via a reaction brake, to the gear train. A first torque-transmitting device (TTD) connects to the first motor, while in this example a second TTD connects to the second motor. The transmission also includes a compound planetary gear arrangement with two interconnected planetary gear sets, each of which has three gear members (e.g., a sun gear, a planet gear, and a ring gear). The compound planetary gear arrangement has four power-transmitting junction points. The first TTD selectively connects the first electric motor to the first junction point of the compound planetary gear arrangement, whereas the second TTD selectively connects the second electric motor to the fourth junction point via the gear train. In contrast, the transmission input member connects to the compound planetary gear arrangement at the second junction point, whereas the transmission output member connects at the third junction point to transfer rotational power from the transmission to the final drive.

Other aspects of the present disclosure are directed to motor vehicles with compound-power-split electrically variable transmissions. A "motor vehicle," as used herein, may include any relevant vehicle platform, such as passenger vehicles (hybrid, electric, fuel cell, etc.), commercial vehicles, industrial vehicles, tracked vehicles, all-terrain vehicles (ATV), farm equipment, motorcycles, etc. In an example, a hybrid electric vehicle includes an internal combustion engine (ICE), two or more electric motor/generators (M/G), and a final drive system with drive wheels mounted to a front and/or rear axle. Also included is an EVT with a transmission case, a transmission input shaft for connecting to the engine's output shaft, and a transmission output shaft for connecting to the drive wheels of the final drive system.

The EVT also includes a gear train disposed within the transmission case, a first clutch connected to the first M/G, a second clutch connected to the second M/G, and a reaction brake for selectively grounding a gear member of the gear train to the transmission case. Also included is a compound planetary gear arrangement with two planetary gear sets, each of which includes three gear members. Two of the three gear members of the first planetary gear set are interconnected with two of the three gear members of the second planetary gear set. One gear member of each planetary gear set may be shared, such as a common sun gear or a common ring gear. The compound planetary gear arrangement has four junction points: the first clutch selectively connects and disconnects the first M/G to and from the first junction point; the second clutch selectively connects and disconnects the second M/G to and from the fourth junction point via the gear train; the transmission input shaft connects at the second junction point; and the transmission output shaft connects at the third junction point.

In yet other aspects of this disclosure, methods for making and methods for using any of the disclosed power transmissions are presented. As another instance, a hybrid powertrain for a motor vehicle includes an engine, two electric motors, a final drive system with one or more drive wheels, and a multi-speed power transmission. This transmission includes an input member for connecting to the engine, an output member for connecting to the final drive system, a stationary member, and a gear train that selectively grounds to the stationary member. A first TTD is operatively connected to the first motor, and a second TTD is operatively connected to the second motor. The transmission also includes a compound planetary gear arrangement with interconnected planetary gear sets, each of which includes three gear members. The compound planetary gear arrangement defines first, second, third and fourth junction points: the first TTD selectively connects the first motor to the first junction point, the second TTD selectively connects the second motor to the fourth junction point via the gear train, the input member is operatively connected to the second junction point, and the output member is operatively connected to the third junction point. It is envisioned that one or more or all of the aforementioned compound planetary gear arrangements take on the form of a compound double planetary gear arrangement.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
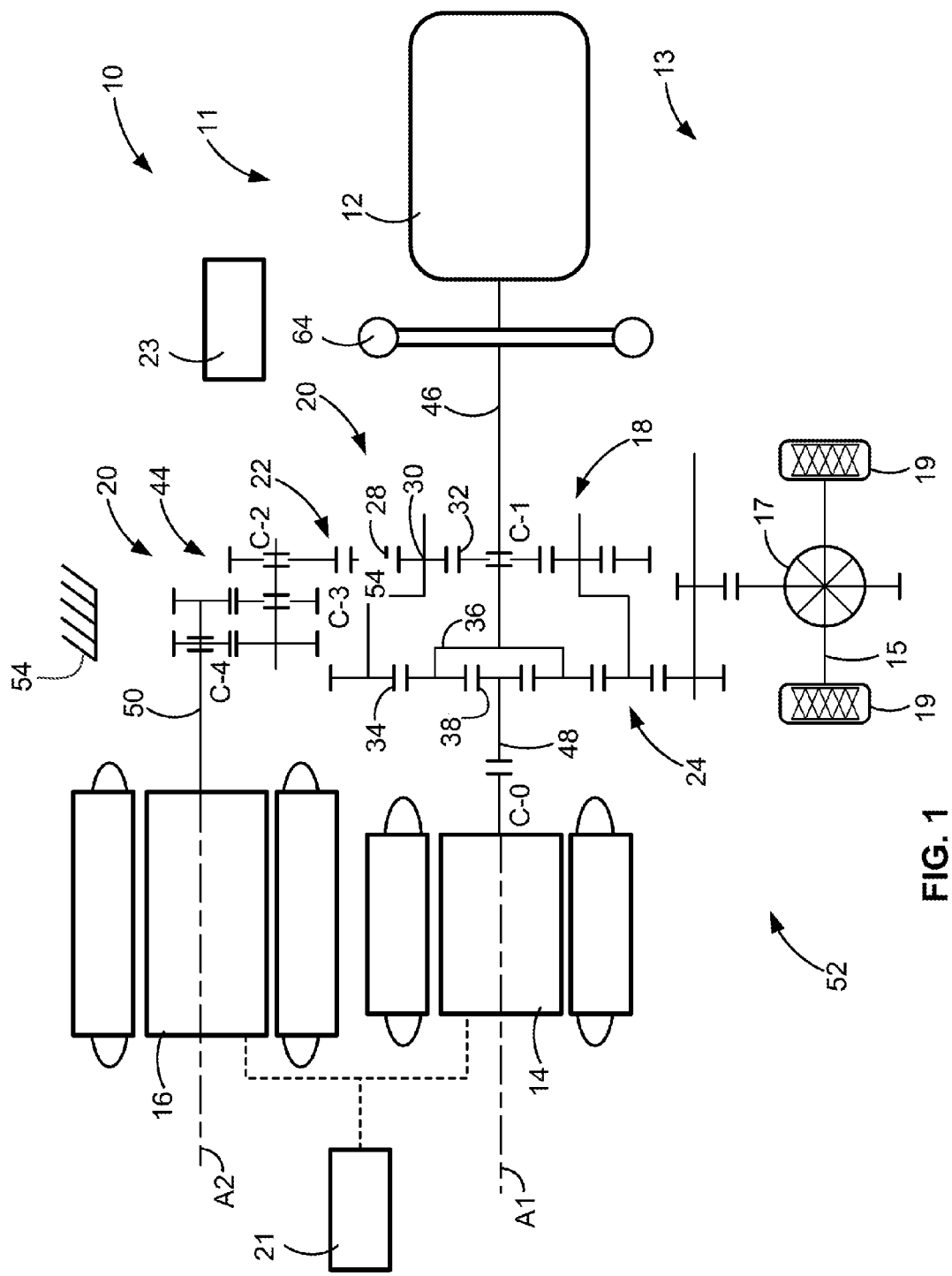
FIG. 1 is a schematic diagram illustrating a compound-power-split electrically variable transmission (EVT) employed as part of a hybrid powertrain for a motor vehicle in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the Drawings. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a schematic illustration of a representative automobile, designated generally at 10, with a compound-power-split hybrid powertrain, designated generally at 11, in accordance with aspects of the present disclosure. The exemplary vehicle powertrain 11 is shown in FIG. 1 with various prime movers, including an engine 12 and a pair of electric motor/generator assemblies 14 and 16, which are drivingly connected to a final drive system 13 by a multi-speed electrically variable transmission (EVT) 18. The final drive system 13 is represented herein by a differential 17 connected to a pair of drive wheels 19 via a vehicle axle 15. The automobile 10—also referred to herein as "motor vehicle" or "vehicle" for short—is merely an exemplary application with which the novel aspects of this disclosure can be practiced. In the same vein, the implementation of the present concepts into hybrid electric architectures should also be appreciated as exemplary applications of the novel concepts disclosed herein. As such, it should be understood that the aspects and features of the present disclosure can be integrated into other vehicle powertrain configurations and utilized for any logically relevant type of motor vehicle. For instance, in the example depicted in FIG. 1, the engine 14 may be any now known or hereinafter developed engine, such as a 2-stroke or 4-stroke internal combustion diesel or a 4-stroke gasoline engine, which is readily adapted to provide available power output typically at a number of revolutions per minute (RPM).

The hybrid powertrain 11 of FIG. 1, for at least some implementations, is designed to launch and propel the vehicle 10, i.e., to operate the vehicle in all speed ranges between low and high road speeds, and to power any or all of the onboard vehicle electronics. Although not explicitly portrayed in FIG. 1, it should be appreciated that the final drive system 13 may comprise any known configuration, e.g., front wheel drive (FWD), rear wheel drive (RWD), four-wheel drive (4WD), all-wheel drive (AWD), etc. The powertrain 11 additionally has an energy storage system 21 that may comprise, for example, one or more battery cells, including lithium-ion, lead acid and nickel-metal hydride variants, arranged as a series of battery modules that is stacked into a battery pack. The energy storage system 21 is operatively connected to the first and second motor/generators 14, 16 such that the motor/generators may transfer torque to or receive torque from the transmission 18. The powertrain 11 also includes an onboard powertrain controller or electronic control unit (ECU) 23 that is operatively connected to the power sources 12, 14, 16 and the energy storage system 21 to control the distribution of torque from these power sources to the EVT 18.

An "electrically variable transmission," as shown in the drawings, comprises a transmission planetary gear train operatively connected to each of the engine 12, the first motor/generator 14, and the second motor/generator 16. Channeling respective torques of the engine 12 and the two motor/generators 14 and 16 to different members of the planetary gear train permits one of the power sources to either assist or balance the operation of any of the other two power sources. Thus, the combination of an engine 12 and multiple motor/generators 14 and 16 operatively connected to the EVT 18 allows speeds and torques of the engine and motor/generators to be controlled and selected independently in order to power a subject vehicle more efficiently.

The EVT 18 incorporating electric machines, such as electric motor/generators 14, 16, may be broadly described as an electro-mechanical drive unit because it is capable of propelling the vehicle 10 without action or power from the engine 12 or without the engine 12 being present. For simplicity and brevity, the present description will refer to both architectures—the electro-mechanical drive unit and the electrically variable transmission—as being connected to the engine 12, as well as to the motor/generators 14, 16, it being understood that the engine 12 can be altogether eliminated or replaced by a different prime mover. Additionally, the connections of the hybrid powertrain 11, to be described in greater detail below, may permit an overall decrease in torque requirement from the combination of the first and the second motor/generators 14 and 16 while affording acceptable vehicle performance, as compared with other systems.

Figure 2:
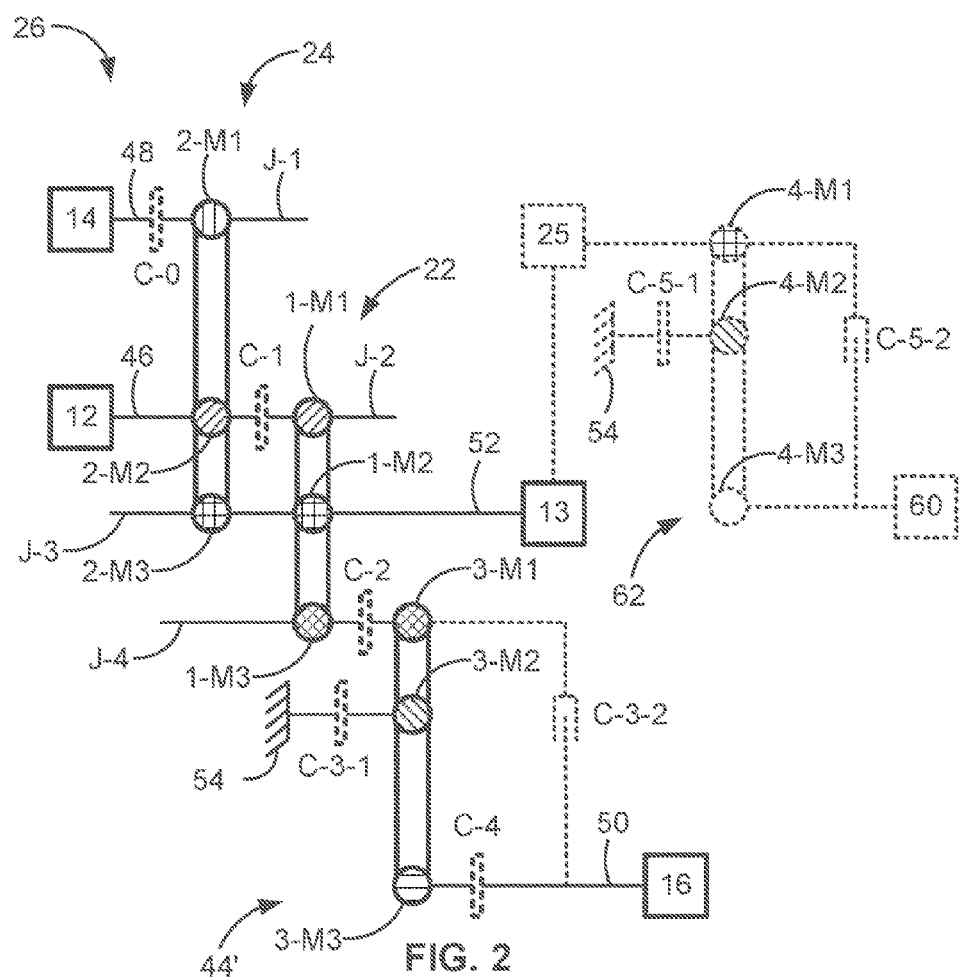
FIG. 2 is a schematic lever diagram of the EVT presented in FIG. 1.

EVT 18 of FIG. 1 includes two or more gear trains—a first planetary gear set (PGS) 22, a second PGS 24 and a gear train 44 (FIG. 1) or third PGS 44' (FIG. 2)—that are represented in lever diagram form in FIG. 2. A lever diagram is a schematic representation of the components of a mechanical device, such as an automatic transmission. As used herein, each lever may be representative of an individual planetary gear set, a compound planetary gear arrangement having two or more interconnected planetary gear sets, or an external gear set. In a planetary gear set lever, the three basic mechanical components of the subject gear train, i.e., the sun gear, planet gear(s) and carrier, and ring gear members, are each represented by a junction point on the particular lever. Therefore, a typical single planetary gear set lever contains three junction points: one for the sun gear member, one for the planet gear carrier member, and one for the ring gear member. A single simple planetary gear set consisting of a sun gear, a surrounding ring gear, and planets that mesh with both the sun gear and the ring gear has the sun gear junction point at one end of such a lever, the ring gear junction point at the other end of the lever, and the carrier junction point along the lever. If so desired, the relative length between the junction points of each planetary gear set lever can be used to represent the ring-to-sun gear ratio of each respective PGS. These lever ratios, in turn, are used to vary the gear ratios of the transmission in order to achieve appropriate ratios and ratio progression. Mechanical couplings or interconnections between the junction points of the various planetary gear sets are illustrated by thin, horizontal lines, whereas torque transmitting devices, such as clutches and brakes, are presented as interleaved fingers and dashed-line boxes. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis" (1981), which is incorporated herein by reference in its entirety.

According to the example illustrated in FIGS. 1 and 2, the EVT 18 in part helps to define the compound-power-split hybrid powertrain 11 architecture by incorporating a compound planetary gear arrangement 20. In general, a four-junction-point lever, as shown in FIG. 2, is established by providing two separate fixed connections or "pairings" between members of one planetary gear set and members of another planetary gear set. Such fixed connections may, for example, be provided between a planet carrier of one gear set and a ring gear of another gear set, or between a planet carrier of one gear set and a sun gear of another. When a single such fixed connection is employed, the subject connection serves to reduce the maximum number of separately rotating inertias (about a common central axis) from six to four, and the total degrees of freedom from four to two. Thus constrained, the compound planetary gear arrangement 20 provides, in order of rotational speed, first, second, third, and fourth junction points. However, it should be recognized that variations to the illustrated compound planetary gear arrangements may be constructed to provide a four-junction point lever that will accomplish such a result, such variations being within the scope of the present disclosure. Compound double planetary gear arrangements are also envisioned.

In FIG. 1, the compound planetary gear arrangement 20 is composed of a first PGS 22 interconnected with a second PGS 24 with two members of the first PGS 22 being operatively connected to two members of the second PGS 24. As may be seen in FIG. 2, a lever diagram 26 representing the compound planetary gear arrangement 20 includes first, second, third, and fourth junction points J-1, J-2, J-3 and J-4, respectively. First junction point J-1 represents or is at least partially defined by a first member 2-M1 of the second planetary gear set 24, whereas the second junction point J-2 represents or is at least partially defined by a second member 2-M2 of the second planetary gear set 24 interconnected with a first member 1-M1 of the first planetary gear set 22. In the same vein, third junction point J-3 represents or is at least partially defined by a third member 2-M3 of the second PGS 24 interconnected with a second member 1-M2 of the first PGS 22, while the fourth junction point J-4 represents or is at least partially defined by a third member 1-M3 of the first PGS 22 interconnected with a first member 3-M1 of the gear train 44/third PGS 44'.

With reference back to FIG. 1, the first PGS 22 is composed of a ring gear member 28, one or more planet gears intermeshed with the ring gear 28 and mounted on a planet carrier member 30, and a sun gear member 32 intermeshed with the planet gear(s) 30 and concentrically aligned with the ring gear 28. Furthermore, the second PGS 24 includes a ring gear member 34, one or more planet gears intermeshed with the ring gear 34 and mounted on a planet carrier member 36, and a sun gear member 38 intermeshed with the planet gear(s) 36 and concentrically aligned with the ring gear 34. As shown in FIG. 2, and consistent with the above structure of the first and second gear sets 22, 24, the first junction point J-1 may represent the sun gear member 38 of the second PGS 24. Additionally, the second junction point J-2 may represent the carrier member 36 of the second gear set 24 interconnected with the sun gear member 32 of the first gear set 22. The third junction point J-3, on the other hand, may represent the ring gear member 34 of the second gear set 24 interconnected with the carrier member 30 of the first gear set 22. Finally, the fourth junction point J-4 may represent the ring gear member 34 of the second gear set 24 interconnected with a gear train, such as with a transfer gear or a gear train 44 (FIG. 1) or a gear member 3-M1 of a third gear set 44' (FIG. 2). The junction points J-2 and J-3 are represented by selectable and fixed interconnections, respectively, such that the resultant structure effectively generates a four-junction point lever when the selectable torque transmitting-device C1 is engaged. As such, the powertrain 10 shown in FIG. 1 is a specific embodiment of a powertrain 10 represented by the lever diagram shown in FIG. 2. Although a specific powertrain 11 is represented in FIG. 1, it will be understood that the particular embodiment is simply exemplary in nature, and other powertrain arrangements within the scope of the lever diagram of FIG. 2 are also contemplated.

As portrayed seen in FIG. 1, the engine 12 and the first motor/generator 14, or at least the respective torque-transmitting output shafts thereof, are disposed for rotation on a common first rotating axis A1. Conversely, the second motor/generator 16, or at least the torque-transmitting output shaft thereof, is disposed for rotation on a second rotating axis A2. According to the illustrated example, the first axis A1 is substantially parallel to the second axis A2. The gear-train 44 of FIG. 1 or third PGS 44' is configured to operatively connect the second motor/generator 16 to the compound planetary gear arrangement 20 at the fourth junction point J-4. The gear-train 44 may be configured as either a single-stage or a two-stage parallel shaft gear set.

Engine 12, first motor/generator 14, and the second motor/generator 16 are operatively connected to the EVT 18 via an input member arrangement that transmits torque from the power sources to the compound planetary gear arrangement 20. By way of non-limiting example, the input member arrangement includes an engine output shaft of the engine 12, which serves as an input member 46; a rotor of the first motor/generator 14, which serves as an input member 48; and a rotor of the second motor/generator 16, which serves as an input member 50. The input member 46 is configured to provide engine torque to the EVT 18. A damper 64, which is operatively connected to the output shaft 46 of the engine 12, is configured to absorb torsional vibrations generated by the engine 12 before such vibrations can be transmitted to the planetary gear arrangement 20 of EVT 18. The motor input members 48 and 50 are each configured to provide torque from their respective motor/generators 14 and 16 to the EVT 18. It may be desirable, as seen in FIG. 2, for the first motor input member 48 to be continuously connected or selectively connectable (e.g., via torque transmitting device C-0) to the first junction point J-1. Second motor input member 50 can be continuously connected or selectively connectable (e.g., via torque transmitting device C-4) to the fourth junction point J-4, via gear train 44/PGS 44'. The EVT 18 also includes an output member 52, which may be in the nature of a transmission output shaft. This output member 52 can be continuously connected to the third junction point J-3 and is operable to transmit output torque from the compound planetary gear arrangement 20 to the final drive 13 for launching and propelling the vehicle.

As may be seen in FIG. 1, the EVT 18 also includes a "stationary member," which may be in the nature of a transmission case or housing 54. A second gear member 3-M2 of the third gear set 44' is selectively connectable with the transmission case 54 via a selectively engageable torque-transmitting device C-3-1 to thereby ground that member of the gear set. Any or all of the illustrated torque-transmitting devices may be selectively engaged and disengaged via an electrically actuated device, such as a solenoid. Additionally, the torque-transmitting device C-3-1 may be configured either as a band brake, a roller-ramp one-way-clutching brake, a dog clutch, or a sprag type brake. The other torque-transmitting devices—C-0, C-1, C-2 and C-4, may each comprise a friction clutch, a dog clutch, or a sprag brake. Accordingly, the torque-transmitting device C-3-1 may be used to brake the second gear member 3-M2 relative to the housing 54.

With reference to FIG. 2, a (first) torque-transmitting device, namely clutch zero C-0, is connected to the first motor/generator 14 and operable to selectively connect and/or disconnect the first motor/generator 14 to/from the first junction point J-1 of the compound planetary gear arrangement 20. Also shown in FIG. 2 is another (second) torque-transmitting device, namely clutch four C-4, that is connected to the second motor/generator 16 and operable to selectively connect and/or disconnect the second motor/generator 16 to/from the fourth junction point J-4, i.e., by connecting and/or disconnecting the motor 16 to/from a third gear member 3-M3 of the third PGS 44'. As indicated in the preceding paragraph, a (third) torque-transmitting device, namely clutch three-one C-3-1 of FIG. 2 is operable to selectively ground the second gear member 3-M2 of the third PGS 44' to the stationary member 54. A (fourth) torque-transmitting device, such as clutch one C-1, is actuable to selectively connect the second gear member 2-M2 of the second planetary gear set 24 with the first gear member 1-M1 of the first planetary gear set 22. A (fifth) torque-transmitting device, such as clutch two C-2, is actuable to selectively connect the first gear member 3-M1 and, thus, the third gear set 44' to the fourth junction point J-4 and, thus, the first gear set 22 by way of the third gear member 1-M3. Lastly, an optional (sixth) torque-transmitting device, which may be in the nature of lockup clutch C-3-2, is actuable in combination with clutch four C-4 to directly connect or "lock" the second motor/generator 16 to the fourth junction point J-4 of the compound planetary gear arrangement 20 by way of the first gear member 3-M1 of PGS 44'. Implementation of clutches C-3-1 and C-3-2 offer system operation at both high torque and high speed. Clutches C-0 and C-4 can be operable to disconnect their respective motors 14 and 16 from the power flow when motor speed is determined to be too high.

As shown in FIGS. 1 and 2, a clutch C-0 may be included and operable to disconnect the first motor/generator 14, a clutch C-1 may be included and operable to separate the compound planetary gear arrangement 20 and thereby to disconnect the second motor/generator 16, a clutch C-2 may be included and operable to disconnect a majority of the gear train 44/44' and the second motor/generator 16, a clutch C-3/C-3-1 may be included and operable to introduce an extra degree of freedom into the gear train 44/44' and thereby to disconnect the second motor/generator 16, and/or a clutch C-4 may be included and operable to disconnect the second motor/generator 16. Clutches (C-3 and C-4) or (C-3-1 and C-3-2) may be include and used to achieve two different speed ratios between that motor/generator 16 and the same member of the compound planetary gear arrangement 20.

Also shown in FIG. 2 is an optional third "redundant" motor/generator 60 that is selectively operable to supply power to an optional final drive 25 and thereby offer all-wheel-drive (AWD) functionality during operation of the vehicle 10. In the illustrated example, the third motor/generator 60 is continuously connected to a third gear member 4-M3 of an optional fourth planetary gear set 62. A (seventh) torque-transmitting device, namely clutch five-one C-5-1 of FIG. 2 is operable to selectively ground a second gear member 4-M2 of the fourth PGS 62 to the stationary member 54. An optional (eighth) torque-transmitting device, which may be in the nature of a lockup clutch C-5-2, is selectively actuable to directly connect or "lock" the third motor/generator 60 to the rear drive axle 25 by way of a first gear member 4-M1 of PGS 62.

That tables below list the engaged and disengaged clutch mechanisms for various operating modes of the EVT 18 illustrated in FIGS. 1 and 2. By way of example, to provide a compound-split operating mode for the EVT 18 when the vehicle 10 is in FWD or AWD mode, first and second motor/generators 14 and 16 are both engaged to provide power to the EVT 18. On the contrary, the system can transition to a "pseudo-gear" state with only the first motor/generator 14 (second motor/generator 16 is disengaged), in which the operation of the EVT 18 is around a fixed gear ratio and variable from that ratio using battery power. For an AWD powertrain, a "full-on" operating mode can be provided by selectively engaging all three motors for power transmission to the final drive. Input-split power flow, in which the speed of one of the motors/generators is proportional to the speed of the vehicle, can be achieved either through engaging the first and third motors, while disengaging the second motor, or by engaging the second and third motors, while disengaging the first motor, depending on which clutches are included in the three-motor system. In a system configuration with three motor/generators, the system can shift between input-split power flow and compound-split power flow by the available disconnect clutches, eliminating drag of the motor-generators that are not necessary for that mode of power flow. This offers a form of multi-mode hybrid with motors for input-split and compound-split operation, and with clutches to remove the "redundant" third motor from the power-flow during operation with the other motor(s). The transition state between input-split and compound-split can be either full-on or pseudo-gear, as illustrated in the table below.

| State for FWD (or RWD) System | C-4 |
|---|---|
| Compound-split | ON |
| Pseudo-gear with motor-generator A only | off |

TABLE 1

| State for AWD System | C-4 | C-5-1 |
|---|---|---|
| Full-on with all motors connected | ON | ON |
| Input-split with front and rear | off | ON |
| Compound-split with rear disconnected | ON | off |
| Pseudo-gear with motor-generator A only | ff | off |

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and aspects.

What is claimed:

1. A multi-speed power transmission for a motor vehicle, the motor vehicle including an engine, first and second electric motors, and a final drive for propelling the vehicle, the transmission comprising:
an input member configured to connect to the engine;
an output member configured to connect to the final drive;
a gear train;
a stationary member;
a first torque-transmitting device configured to connect to the first motor;
a second torque-transmitting device configured to connect to the second motor;
a lockup clutch configured to connect to the second motor; and
a compound planetary gear arrangement including first and second interconnected planetary gear sets, each of the planetary gear sets including three gear members, the compound planetary gear arrangement having first, second, third and fourth junction points,
wherein the first torque-transmitting device is configured to selectively connect the first motor to the first junction point of the compound planetary gear arrangement,
wherein the second torque-transmitting device is configured to selectively connect the second motor to the fourth junction point via the gear train,
wherein the lockup clutch is configured to selectively connect the second motor directly to the fourth junction point of the compound planetary gear arrangement,
wherein the input member is operatively connected to the compound planetary gear arrangement at the second junction point, and
wherein the output member is operatively connected to the compound planetary gear arrangement at the third junction point.

2. The transmission of claim 1, wherein the gear train includes a third planetary gear set with three respective gear members.

3. The transmission of claim 2, further comprising a third torque-transmitting device configured to selectively ground one of the gear members of the third planetary gear set of the gear train to the stationary member.

4. The transmission of claim 1, wherein two of the three gear members of the first planetary gear set are interconnected with two of the three gear members of the second planetary gear set.

5. The transmission of claim 1, wherein each of the first and second torque-transmitting devices comprises a friction clutch, a dog clutch, or a sprag brake.

6. The transmission of claim 1, wherein the three gear members of each of the first and second planetary gear sets includes a sun gear, a planet gear intermeshed with the sun gear, and a ring gear intermeshed with the planet gear and concentric with the sun gear.

7. The transmission of claim 1, wherein an output shaft of the first electric motor rotates about a first rotating axis, and an output shaft of the second electric motor rotates about a second rotating axis, the first and second rotating axes being substantially parallel.

8. The transmission of claim 7, wherein an output shaft of the engine rotates about a third rotating axis, the first, second and third rotating axes being substantially parallel.

9. A multi-speed power transmission for a motor vehicle, the motor vehicle including an engine, first and second electric motors, and a final drive for propelling the vehicle, the transmission comprising:
an input member configured to connect to the engine;
an output member configured to connect to the final drive;
a gear train;
a stationary member;
a first torque-transmitting device configured to connect to the first motor;
a second torque-transmitting device configured to connect to the second motor; and a compound planetary gear arrangement including first and second interconnected planetary gear sets, each of the planetary gear sets including three gear members, the compound planetary gear arrangement having first, second, third and fourth junction points, wherein the first torque-transmitting device is configured to selectively connect the first motor to the first junction point of the compound planetary gear arrangement, wherein the second torque-transmitting device is configured to selectively connect the second motor to the fourth junction point via the gear train, wherein the input member is operatively connected to the compound planetary gear arrangement at the second junction point, wherein the output member is operatively connected to the compound planetary gear arrangement at the third junction point, and wherein the first junction point is defined by a first gear member of the second planetary gear set, the second junction point is defined by a second gear member of the second planetary gear set interconnected with a first gear member of the first planetary gear set, the third junction point is defined by a third gear member of the second planetary gear set interconnected with a second gear member of the first planetary gear set, and the fourth junction point is defined by a third gear member of the first planetary gear set interconnected with a gear member of the gear train.

10. The transmission of claim 9, further comprising a lockup clutch configured to directly connect the second motor to the fourth junction point of the compound planetary gear arrangement.

11. A multi-speed power transmission for a motor vehicle, the motor vehicle including an engine, first and second electric motors, and a final drive for propelling the vehicle, the transmission comprising:
   an input member configured to connect to the engine;
   an output member configured to connect to the final drive;
   a gear train;
   a stationary member;
   a first torque-transmitting device configured to connect to the first motor;
   a second torque-transmitting device configured to connect to the second motor; and
   a compound planetary gear arrangement including first and second interconnected planetary gear sets, each of the planetary gear sets including three gear members, the compound planetary gear arrangement having first, second, third and fourth junction points,
   wherein the first torque-transmitting device is configured to selectively connect the first motor to the first junction point of the compound planetary gear arrangement,
   wherein the second torque-transmitting device is configured to selectively connect the second motor to the fourth junction point via the gear train,
   wherein the input member is operatively connected to the compound planetary gear arrangement at the second junction point,
   wherein the output member is operatively connected to the compound planetary gear arrangement at the third junction point, and
   wherein the gear members of the interconnected planetary gear sets comprise a sun gear member of the first planetary gear set interconnected with a planet carrier member of the second planetary gear set, and a planet carrier member of the first planetary gear set interconnected with a ring gear member of the second planetary gear set.

12. The transmission of claim 11, further comprising a fourth torque-transmitting device configured to selectively connect one of the interconnected two gear members of the first planetary gear set with one of the interconnected two gear members of the second planetary gear set.

13. A multi-speed power transmission for a motor vehicle, the motor vehicle including an engine, first and second electric motors, and a final drive for propelling the vehicle, the transmission comprising:
   an input member configured to connect to the engine;
   an output member configured to connect to the final drive;
   a gear train;
   a stationary member;
   a first torque-transmitting device configured to connect to the first motor;
   a second torque-transmitting device configured to connect to the second motor;
   a fifth torque-transmitting device configured to connect to the gear train; and
   a compound planetary gear arrangement including first and second interconnected planetary gear sets, each of the planetary gear sets including three gear members, the compound planetary gear arrangement having first, second, third and fourth junction points,
   wherein the first torque-transmitting device is configured to selectively connect the first motor to the first junction point of the compound planetary gear arrangement,
   wherein the second torque-transmitting device is configured to selectively connect the second motor to the fourth junction point via the gear train,
   wherein the input member is operatively connected to the compound planetary gear arrangement at the second junction point,
   wherein the output member is operatively connected to the compound planetary gear arrangement at the third junction point, and
   wherein the fifth torque-transmitting device is configured to selectively connect the gear train to the fourth junction point of the compound planetary gear arrangement.

14. A hybrid electric vehicle, comprising:
   an internal combustion engine with an engine output shaft;
   first and second electric motor/generators (M/G);
   a final drive system with a plurality of drive wheels mounted to an axle;
   an electrically variable transmission (EVT) including:
      an input shaft operatively connected to the engine output shaft of the internal combustion engine;
      an output shaft operatively connected to the drive wheels of the final drive system via the axle;
      a transmission case;
      a gear train disposed within the transmission case;
      a first clutch connected to the first M/G;
      a second clutch connected to the second M/G;
      a lockup clutch configured to connect to the second M/G;
      a reaction brake configured to selectively ground one gear member of the gear train to the transmission case; and
      a compound planetary gear arrangement including first and second planetary gear sets, each of the planetary gear sets including three gear members, two of the three gear members of the first planetary gear set being interconnected with two of the three gear members of the second planetary gear set, the compound planetary gear arrangement having first, second, third and fourth junction points, wherein the first clutch is configured to selectively connect and disconnect the first M/G to and from the first junction point of the compound planetary gear arrangement, wherein the second clutch is configured to selectively connect and disconnect the second M/G to and from the fourth junction point via the gear train, wherein the lockup clutch is configured to selectively connect and disconnect the second M/G directly to and from the fourth junction point, wherein the transmission input shaft is operatively connected to the compound planetary gear arrangement at the second junction point, and wherein the transmission output shaft is operatively connected to the compound planetary gear arrangement at the third junction point.

15. A hybrid powertrain for a motor vehicle, the hybrid powertrain comprising:
an engine;
first and second electric motors;
a final drive system with one or more drive wheels; and
a multi-speed power transmission including:
an input member operatively connected to the engine;
an output member operatively connected to the final drive system;
a stationary member;
a gear train configured to selectively ground to the stationary member;
a first torque-transmitting device operatively connected to the first motor;
a second torque-transmitting device operatively connected to the second motor;
a lockup clutch operatively connected to the second motor; and
a compound planetary gear arrangement including first and second interconnected planetary gear sets, each of the planetary gear sets including first, second and third gear members, the compound planetary gear arrangement having first, second, third and fourth junction points,
wherein the first torque-transmitting device is configured to selectively connect the first motor to the first junction point of the compound planetary gear arrangement,
wherein the second torque-transmitting device is configured to selectively connect the second motor to the fourth junction point via the gear train,
wherein the lockup clutch is configured to selectively connect the second motor directly to the fourth junction point of the compound planetary gear arrangement,
wherein the input member is operatively connected to the compound planetary gear arrangement at the second junction point, and
wherein the output member is operatively connected to the compound planetary gear arrangement at the third junction point.

16. The hybrid powertrain of claim 15, wherein the gear train includes a third planetary gear set with three respective gear members.

17. The hybrid powertrain of claim 15, further comprising a third torque-transmitting device configured to selectively ground one gear member of the gear train to the stationary member.

18. The hybrid powertrain of claim 15, wherein two of the three gear members of the first planetary gear set are interconnected with two of the three gear members of the second planetary gear set.

19. A hybrid powertrain for a motor vehicle, the hybrid powertrain comprising:
an engine;
first and second electric motors;
a final drive system with one or more drive wheels; and
a multi-speed power transmission including:
an input member operatively connected to the engine;
an output member operatively connected to the final drive system;
a stationary member;
a gear train configured to selectively ground to the stationary member;
a first torque-transmitting device operatively connected to the first motor;
a second torque-transmitting device operatively connected to the second motor;
a compound planetary gear arrangement including first and second interconnected planetary gear sets, each of the planetary gear sets including first, second and third gear members, the compound planetary gear arrangement having first, second, third and fourth junction points,
wherein the first torque-transmitting device is configured to selectively connect the first motor to the first junction point of the compound planetary gear arrangement,
wherein the second torque-transmitting device is configured to selectively connect the second motor to the fourth junction point via the gear train,
wherein the input member is operatively connected to the compound planetary gear arrangement at the second junction point,
wherein the output member is operatively connected to the compound planetary gear arrangement at the third junction point, and
wherein the first junction point is defined by a first gear member of the second planetary gear set, the second junction point is defined by a second gear member of the second planetary gear set interconnected with a first gear member of the first planetary gear set, the third junction point is defined by a third gear member of the second planetary gear set interconnected with a second gear member of the first planetary gear set, and the fourth junction point is defined by a third gear member of the first planetary gear set interconnected with a gear member of the gear train.

20. The hybrid powertrain of claim 19, further comprising a lockup clutch configured to directly connect the second motor to the fourth junction point of the compound planetary gear arrangement.

* * * * *